(No Model.)
M. S. MILLER.
ANIMAL TRAP.
No. 432,493. Patented July 15, 1890.
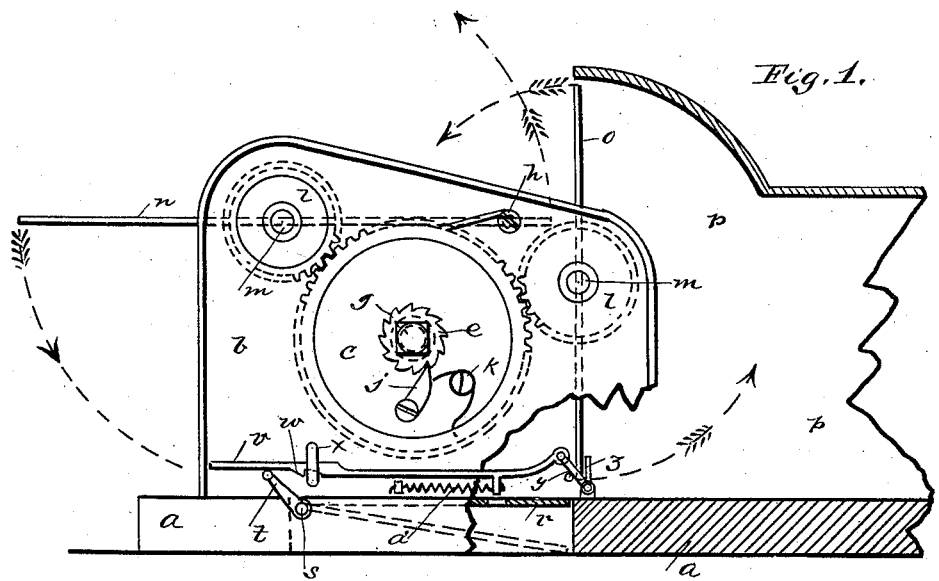
Fig. 1.
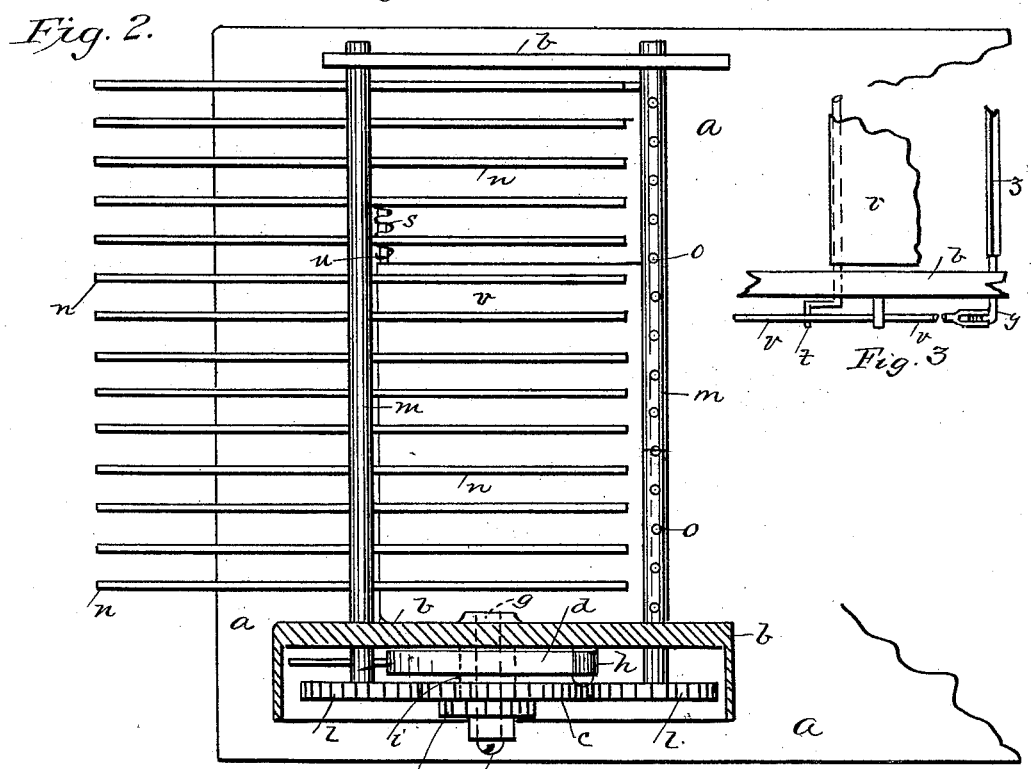
Fig. 2.
Fig. 3.
Witnesses:
Inventor
Martin S. Miller
Per. O. D. Levis
Att'y

UNITED STATES PATENT OFFICE.

MARTIN S. MILLER, OF PITTSBURG, PENNSYLVANIA, ASSIGNOR OF ONE-HALF TO JOHN KELLAND, OF SAME PLACE.

ANIMAL-TRAP.

SPECIFICATION forming part of Letters Patent No. 432,493, dated July 15, 1890.

Application filed November 30, 1889. Serial No. 332,127. (No model.)

*To all whom it may concern:*

Be it known that I, MARTIN S. MILLER, a citizen of the United States, residing at Pittsburg, in the county of Allegheny and State of Pennsylvania, have invented certain new and useful Improvements in Animal-Traps; and I do hereby declare the following to be a full, clear, and exact description of the invention, such as will enable others skilled in the art to which it pertains to make and use the same, reference being had to the accompanying drawings, which form a part of this specification.

My invention relates to an improvement in animal-traps; and it consists in two sweeps, the one arranged at an angle with the other, a means for revolving the said sweeps and holding the same stationary, and a trip or treadle to set the said sweeps in motion, together with certain other details of construction and combination of parts, as will be fully described hereinafter.

In the accompanying drawings, Figure 1 is an end elevation of my improved animal-trap, which is constructed in accordance with my invention. Fig. 2 is a plan view of the same. Fig. 3 is a plan view of the trip mechanism.

To put my invention into practice I provide a base-plate $a$, and secure thereon two frames $b$, arranged at each end of the plate $a$ and parallel to each other. Secured near the center of one of these frames $b$ is a small gear-wheel $c$, operated by a coil-spring $d$, placed between the frame $b$ and the said wheel. This gear-wheel $c$ is mounted on a sleeve $i$, having a small ratchet $e$ integral therewith, and the said sleeve $i$ held in position on a stud $g$ by means of a screw. The coil-spring $d$ at the rear of the toothed wheel $c$ is attached by a screw $h$ to the frame $b$ and to the said sleeve $i$ in such a manner that when tension is placed on the spring $d$ by winding the said toothed wheel $c$ will rapidly revolve. A pawl $j$, attached to the gear-wheel $c$, engages with the ratchet-wheel $e$ by means of a light spring $k$ and locks the said sleeve $i$ to the wheel $c$ in one direction, after the manner of clock-works. Arranged at each side of this toothed wheel $c$ and meshing with the same are two small spur-wheels $l$, each of which have proper bearings in the frames $b$, and each attached separately to shafts $m$. Each of these shafts $m$ is provided with a series of parallel bars $n$ $o$, the one series set in a manner that will admit the same to pass between the other without interfering. These two sets of bars or sweeps $n$ $o$ when at rest are at right angles to each other, the one $o$ in a vertical position, closing an open-fronted box or cage $p$, in which the rats or other animals are thrown by the trap. Arranged over an opening $q$ in the base-plate $a$ is a trip-plate $r$, hinged at one side by a rod $s$, and held level or flush with the top of the plate $a$ by a light coil-spring $u$, suitably arranged about one end of the said rod $s$. The other end of this rod $s$ is formed into an upwardly-projecting crank $t$, adapted to move vertically when the trip-plate $r$ is depressed. Arranged above this last-described crank $t$ in a horizontal position is a bar $v$, having a notch $w$ formed on its under side, which engages with a staple $x$, attached to the frame $b$. This bar $v$ is attached by a crank $y$ to a vertical flap $z$, placed in front of the lower extremities of the vertical sweep $o$, and hinged in that position in a manner that when the said flap $z$ is released the same allows the vertical sweep $o$ to revolve once about its axis, and in so turning permits the other sweep $n$ also to make a full turn. A spring $a'$, attached to the bar $v$ and to the frame $b$, will re-engage the notch $w$ with the staple by drawing the bar $v$ back, thereby elevating the flap $z$, and prevent the sweeps from making a second turn or revolution until the trip-plate $r$ is again depressed.

In operation the spring $d$ is wound by applying a suitable key to the square end of the sleeve $i$. Suitable "bait" is placed beneath the trip-plate $r$, the scent of which attracts the animals onto the same. When the slightest pressure or weight is placed on the trip-plate $r$, the same is depressed, thereby elevating the crank $t$, which lifts the notch $w$ out of the staple $x$, releases the flap $z$, which permits the two sweeps $n$ $o$ to turn once about their axes, and thereby sweep the animal into the box $p$. The spring $a'$, recovering the bar $v$, engages the notch $w$ with the staple $x$ and stops the motion of the sweeps $n$ $o$ by the one $o$ coming in contact with the flap $z$, and the trap is again in position for another animal.

It is obvious that any number of animals may be trapped by this device, as the sweeps are always stopped in the same position and animals caught until the spring has unwound itself.

Having thus described my invention, what I claim, and desire to secure by Letters Patent, is—

1. In an animal-trap, substantially as described, the combination of a shaft having a series of arms which are arranged in a vertical position when the shaft is at rest, another shaft having a series of arms which lie in a horizontal position and at right angles to the arms on the other shaft, a common driving mechanism geared to both shafts to simultaneously rotate the same, and a trip mechanism for controlling the driving mechanism and arresting the shafts when they have each made one complete revolution, as and for the purpose described.

2. In an animal-trap, the combination of the parallel shafts each having a series of arms which are arranged substantially as described, a common driving mechanism geared to both shafts, a trip-plate having a crank-arm, a sliding notched bar adapted to be lifted by said crank-arm, a pivoted detent which engages the arms on one shaft and operates to arrest the motion thereof and of the other shaft, and a spring for impelling the notched bar in a direction to release the detent from the arms as the trip-plate is depressed, substantially as described.

3. In an animal-trap, the combination of a shaft having a series of arms which are arranged in a vertical position when the shaft is at rest, another shaft having its arms arranged when the shaft is at rest in a horizontal position and at right angles to the arms on the first-mentioned shaft, said arms being arranged out of line with each other, a spring-controlled driving-wheel geared to both shafts for simultaneously rotating the same in opposite directions, a pivoted detent or flap which engages the arms on one shaft, an endwise movable notched bar linked to said detent or flap, and a pivoted trip-plate having an arm which impinges against the bar to raise the latter as the trip-plate is depressed, as and for the purpose described.

In testimony that I claim the foregoing I hereunto affix my signature this 25th day of October, A. D. 1889.

MARTIN S. MILLER. [L. S.]

In presence of—
  C. C. LEE,
  M. E. HARRISON.